US010063973B2

(12) United States Patent
Mezzomo et al.

(10) Patent No.: US 10,063,973 B2
(45) Date of Patent: Aug. 28, 2018

(54) REMOVABLE SPEAKER SYSTEM

(71) Applicant: Harman International Industries, Inc., Stamford, CT (US)

(72) Inventors: Stephen Mezzomo, West South Lyon, MI (US); Bradford Hamme, Farmington, MI (US); Christopher M. Dragon, Huntington Station, NY (US); Darby Hadley, Birmingham, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/288,414

(22) Filed: Oct. 7, 2016

(65) Prior Publication Data

US 2017/0105069 A1 Apr. 13, 2017

Related U.S. Application Data

(60) Provisional application No. 62/238,991, filed on Oct. 8, 2015.

(51) Int. Cl.
*H04B 1/00* (2006.01)
*H04R 3/14* (2006.01)
*H04R 1/02* (2006.01)

(52) U.S. Cl.
CPC ............... *H04R 3/14* (2013.01); *H04R 1/026* (2013.01); *H04R 2205/021* (2013.01); *H04R 2205/026* (2013.01); *H04R 2420/03* (2013.01); *H04R 2499/13* (2013.01)

(58) Field of Classification Search
CPC .... H04R 3/14; H04R 1/026; H04R 2205/021; H04R 2205/026; H04R 2420/03; H04R 2499/13
USPC .................................. 381/86, 302, 332, 334
See application file for complete search history.

(56) References Cited

U.S. PATENT DOCUMENTS 6,813,528 B1 * 11/2004 Yang .................... G06F 1/1632 381/306
8,638,957 B2 1/2014 Sim et al.
2004/0052062 A1 * 3/2004 DeLuga ................ G06F 1/1632 361/801
2013/0325479 A1 * 12/2013 Krueger .................. G10L 21/00 704/275
2014/0341404 A1 11/2014 Choisel et al.
2015/0002088 A1 1/2015 D'Agostino

OTHER PUBLICATIONS

JBL by Harman, "Voyager Integrated Home Audio System with Portable Wireless Speaker," Harman International Industries, Inc. (2013).

* cited by examiner

*Primary Examiner* — William A Jerez Lora
(74) *Attorney, Agent, or Firm* — Brooks Kushman P.C.

(57) ABSTRACT

A speaker assembly is provided with a housing, a first speaker and a second speaker both supported by the housing, and a controller. The controller is programmed to determine a location of the housing relative to a docking station. The controller is further programmed to disable the second speaker and control the first speaker to play a low-frequency component of an audio signal in response to the housing being located proximate to the docking station.

20 Claims, 6 Drawing Sheets

REMOVABLE SPEAKER SYSTEM

CROSS-REFERENCE TO RELATED APPLICATIONS

This application claims the benefit of U.S. provisional application Ser. No. 62/238,991 filed Oct. 8, 2015, the disclosure of which is hereby incorporated in its entirety by reference herein.

TECHNICAL FIELD

One or more embodiments relate to a speaker system that is operable with a vehicle audio system and also operable independent of the vehicle audio system as a portable speaker.

BACKGROUND

Portable speaker systems that are operable with multiple audio systems are known. For example, the Voyager by JBL® is an integrated home audio system with a portable wireless speaker that is detachable from a dock and communicates with other media devices as a portable speaker.

Vehicle audio systems typically include speakers that are distributed around the vehicle interior to provide sound. Premium vehicle audio systems often include large subwoofers with dedicated amplifiers. Due to their size, these large subwoofers are often mounted in the rear portion of a vehicle, e.g., in the trunk or in the rear storage compartment.

SUMMARY

In one embodiment, a speaker system is provided with a first speaker, a second speaker and a controller. The controller is configured to receive a first audio signal having at least one of a low-frequency component, a mid-range-frequency component and a high-frequency component from a vehicle audio system, determine the location of the speaker system relative to a vehicle and to disable the second speaker and control the first speaker to play the low-frequency component of the first audio signal in response to the speaker system being located within a vehicle. The controller is also configured to receive a second audio signal including a low-frequency component, a mid-range-frequency component and a high-frequency component from a media device. The controller is further configured to control the first speaker to play the low-frequency component of the second audio signal and the second speaker to play at least one of the mid-range-frequency component and the high-frequency component of the second audio signal in response to the speaker system being located outside of the vehicle.

In another embodiment, a speaker assembly is provided with a housing, a first speaker and a second speaker both supported by the housing and a controller. The controller is programmed to determine a location of the housing relative to a docking station, and to disable the second speaker and control the first speaker to play a low-frequency component of an audio signal in response to the housing being located proximate to the docking station.

In yet another embodiment, a speaker assembly is provided with a housing, a first speaker and a second speaker both supported by the housing and a controller. The controller is configured to determine a location of the housing relative to a docking station and to disable the second speaker and provide a low-frequency component of an audio signal to the first speaker in response to the housing being located proximate to the docking station. The controller is further configured to provide the low-frequency component of the audio signal to the first speaker, and to provide at least one of a mid-range-frequency component and a high-frequency component of the audio signal to the second speaker in response to the housing being located remote from the docking station.

In still yet another embodiment, a method for controlling a speaker system is provided. An audio signal having at least one of a low-frequency component, a mid-range-frequency component and a high-frequency component is received. A location of a speaker system relative to a docking station is determined. A second speaker of the speaker system is disabled; and the low-frequency component of the audio signal is provided to a first speaker of the speaker system in response to the speaker system being located proximate to the docking station. The low-frequency component of the audio signal is provided to the first speaker; and at least one of the mid-range-frequency component and the high-frequency component of the audio signal is provided to the second speaker in response to the speaker system being located remote from the docking station.

As such the speaker system provides a portable wireless speaker that is recharged while docked in the vehicle and available wherever the user travels with their vehicle. Thus eliminating the need to purchase a separate portable wireless speaker.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
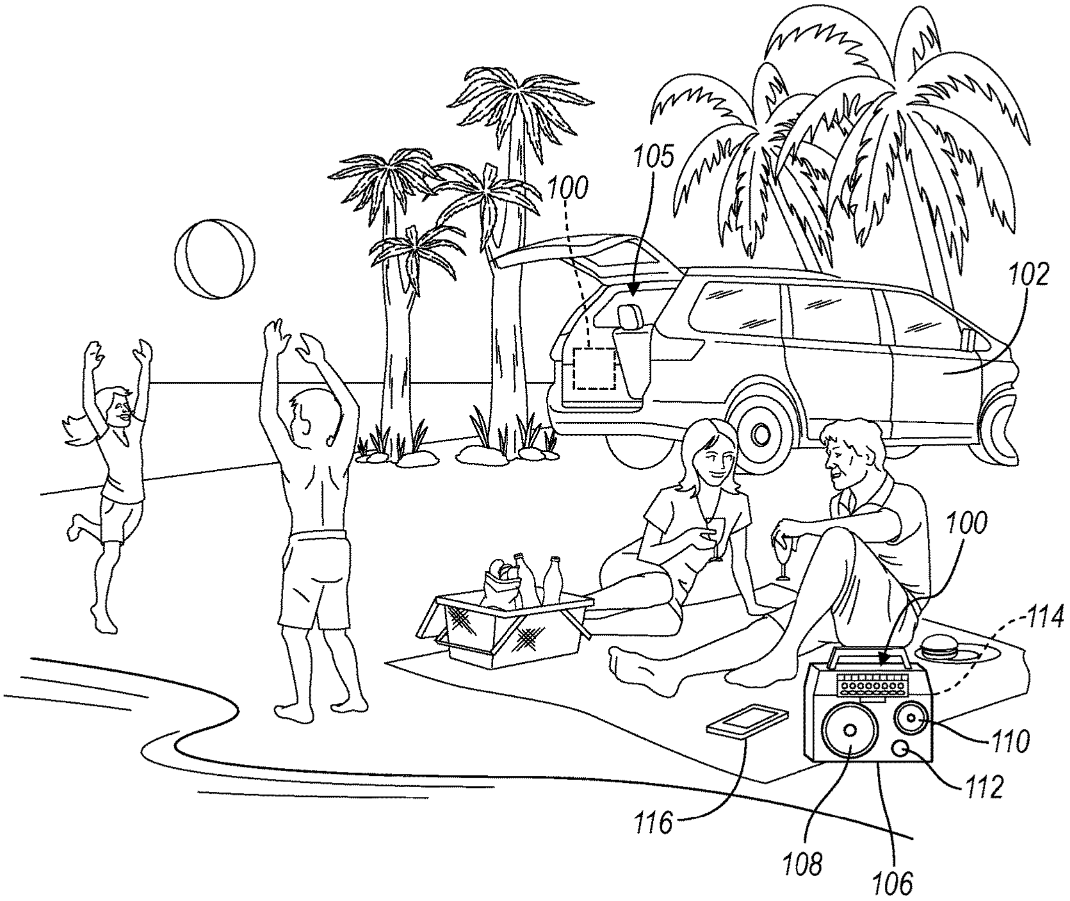
FIG. 1 is a front perspective view of a speaker system according to one or more embodiments, illustrated remote from a vehicle.

With reference to FIG. 1, a speaker system is illustrated in accordance with one or more embodiments and generally illustrated by numeral 100. The speaker system 100 may be mounted to a vehicle 102 and operable as a component of a vehicle audio system 104 (shown in FIG. 4.) For example, the speaker system 100 may be mounted within a rear storage compartment 105 of the vehicle 102. The speaker system 100 may also be removed from the vehicle 102 and function as a portable speaker system, as depicted in FIG. 1. The speaker system 100 includes a housing 106 that supports at least three speakers, a low-frequency speaker 108 (e.g., a subwoofer), a mid-range speaker 110 and a high-frequency speaker 112 (e.g., a tweeter).

The speaker system 100 also includes a controller 114 for controlling the speakers 108, 110 and 112 based on their location relative to the vehicle 102. In one embodiment, the controller 114 disables the mid-range speaker 110 and the tweeter 112 when the speaker system 100 is mounted within the vehicle 102, and allows only the subwoofer 108 to function as part of the vehicle audio system 104. The controller 114 enables all speakers (i.e., the subwoofer 108 the mid-range speaker 110 and the tweeter 112) to provide a full range of sound when the speaker system 100 is located outside of the vehicle 102.

When located outside of the vehicle 102, the controller 114 of the speaker system 100 communicates with a media device 116 for receiving audio signals. The controller 114 includes one or more drivers, amplifiers and crossovers (not shown). The crossover separates the audio signal by frequency into a low-frequency component, a medium frequency component and a high frequency component and sends the audio signal components to the appropriate speakers. According to the illustrated embodiment, the speaker system 100 communicates wirelessly with a mobile phone (media device) 116 for receiving audio input. In other embodiments the speaker system 100 communicates with a media device through wired communication, or wirelessly with the vehicle audio system 104 when located outside of the vehicle 102 for receiving analog and/or digital audio input (not shown).

Figure 2:
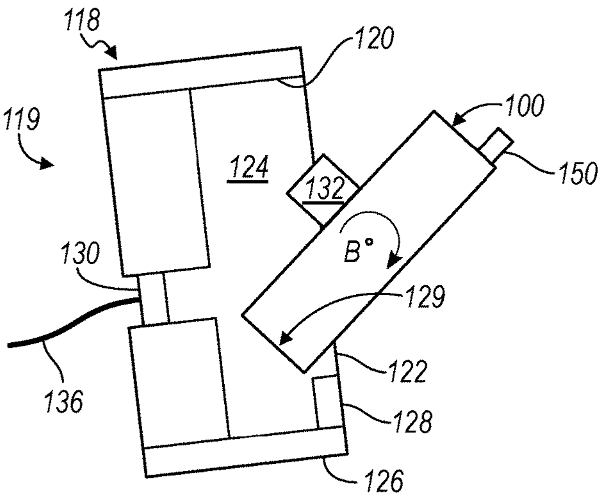
FIG. 2 is a side view of the speaker system of FIG. 1 according to one embodiment, illustrated adjacent to a docking station within the vehicle.
Figure 3:
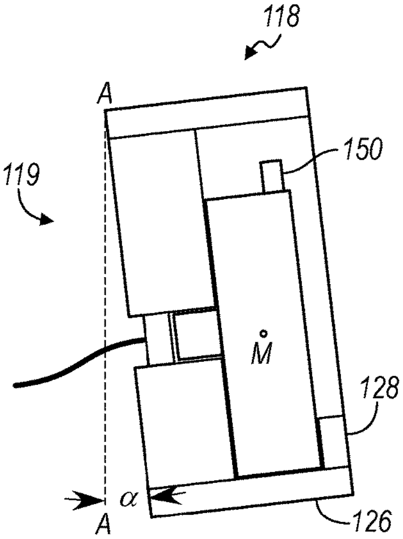
FIG. 3 is another side view of the speaker system of FIG. 1 according to one embodiment, illustrated mounted to the docking station.

Referring to FIGS. 2-3, the speaker system 100 mounts to a docking station 118. The speaker system 100 and docking station 118 are collectively referred to as a speaker assembly 119 herein. The docking station 118 includes a recess 120 that is formed into a panel 122 of the vehicle 102. The recess 120 defines a cavity 124 that is sized for receiving the speaker system 100. The docking station 118 includes a base 126 for supporting the speaker system 100 and a projection 128 that extends transversely from an inner end of the base 126. The panel 122 is offset at an angle ($\alpha$) from a vertical axis (a) according to the illustrated embodiment. The angle $\alpha$ of the panel 122 biases the center of mass (m) of the speaker system 100 towards the panel 122; and the projection 128 engages a lower end 129 of the speaker system 100 to help retain the speaker system 100 within the recess 120.

The docking station 118 includes an electrical connector 130 that mates with a corresponding speaker connector 132 of the speaker system 100. The electrical connector 130 is connected to a vehicle battery 134 (shown in FIG. 4) by a vehicle harness 136; and the speaker connector 132 is connected to a speaker battery 138 by speaker wires 140 (shown in FIG. 4) to collectively form a charging circuit 142 for charging the speaker battery 138.

Figure 4:
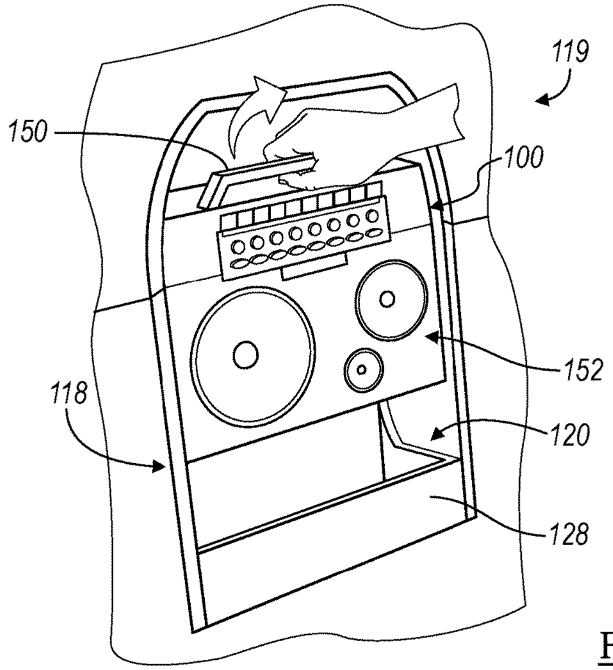
FIG. 4 is a front perspective view of the speaker system of FIG. 3.

FIGS. 2-3 illustrate a process for mounting the speaker system 100 to the docking station 118. As shown in FIG. 2, the speaker system 100 is rotated clockwise about an imaginary horizontal axis B, and the lower end 129 is inserted into the recess 120. Then, the speaker system 100 is rotated counter-clockwise about the B-axis until the speaker connector 132 mates with the electrical connector 130, as shown in FIG. 3. With reference to FIG. 4, to remove the speaker system 100 from the docking station 118, a user pulls a handle 150 that extends from an upper end of the speaker system 100, which rotates the speaker system 100 clockwise about the B-axis, and then lifts the speaker system 100 out of the recess 120. The speaker system 100 illustrated in FIGS. 1-4 depicts a "retro" 1980's styled speaker system with a rectangular shaped front facie 152.

Figure 5:
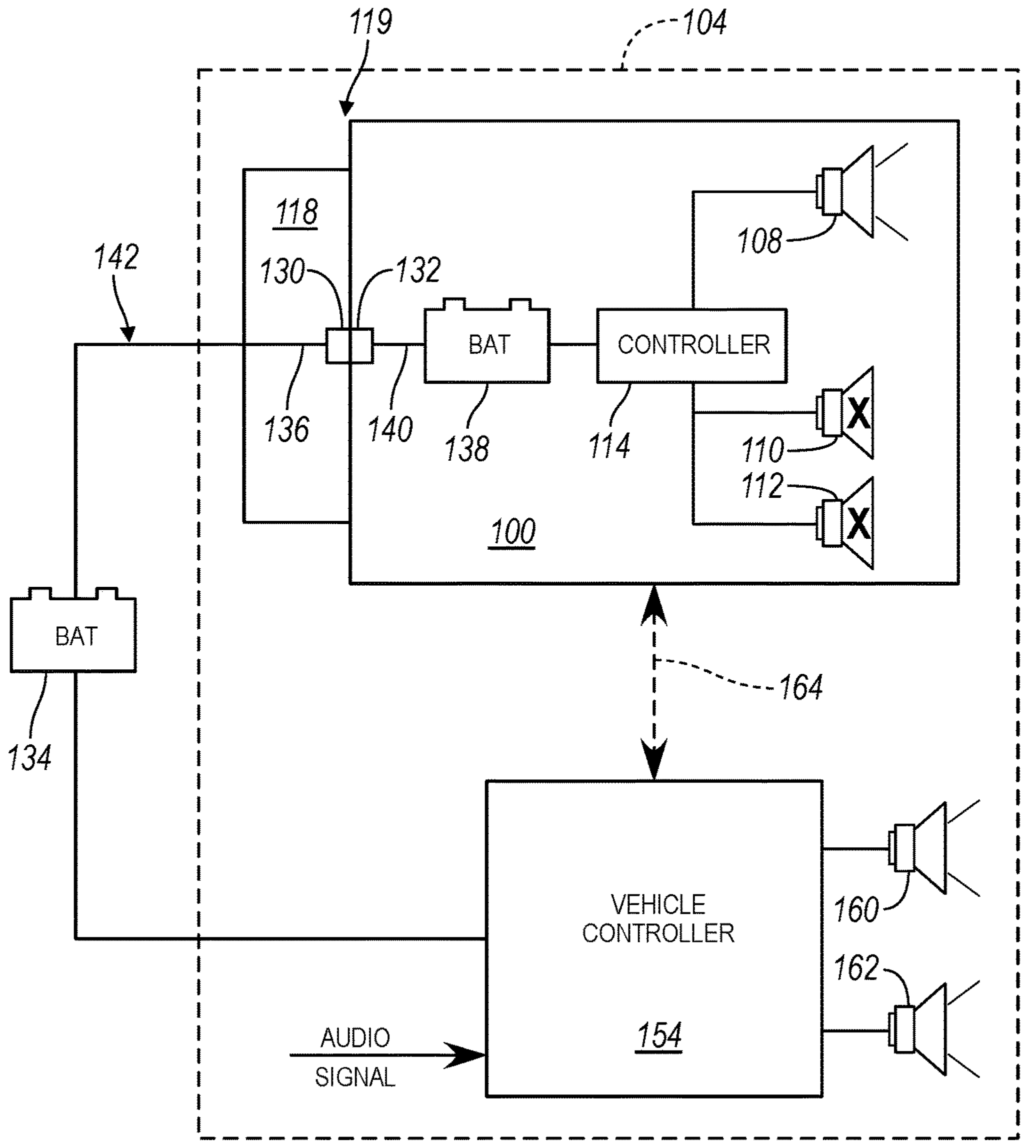
FIG. 5 is a system diagram of a vehicle audio system including the speaker system of FIG. 1.

FIG. 5 is a system diagram illustrating electrical communication within the vehicle audio system 104. The vehicle audio system 104 includes a vehicle controller 154, or "vehicle head unit" and the speaker system 100 while it is mounted within the vehicle 102. The vehicle audio system 104 also includes at least one vehicle mid-range speaker 160 and at least one vehicle tweeter 162. The vehicle controller 154 and the controller 114 each include one or more transceivers (not shown) for communicating with each other. In the illustrated embodiment, the controller 114 and the vehicle controller 154 communicate wirelessly with each other, as depicted by dashed signal line 164. However, in other embodiments, the controllers 114, 154 are connected by audio wires (not shown) for providing wired communication.

Vehicle audio systems typically include speakers that are distributed around the vehicle interior to provide stereo sound. High-end audio systems often include large subwoofers with dedicated amplifiers. Due to their size, these large subwoofers are often mounted in the rear portion of a vehicle, e.g., in the trunk or in the rear storage compartment 105. Since the speaker system 100 is mounted in the rear storage compartment 105 of the vehicle 102, the vehicle audio system 104 utilizes the subwoofer 108. The vehicle audio system 104 includes a vehicle mid-range speaker 160 and a vehicle tweeter 162, and therefore does not utilize the additional mid-range speaker 110 or tweeter 112 of the speaker system 100. Therefore the mid-range speaker 110 and the tweeter 112 are disabled, when located in the rear storage compartment 105 of the vehicle 102, as depicted by the "x"s disposed over them in FIG. 4. The controller 114 disables the mid-range speaker 110 and the tweeter 112 by disconnecting power to them in one embodiment, or by not providing them with an audio signal in other embodiments.

The vehicle controller 154 includes one or more receivers (not shown) for receiving analog and digital audio signals from an external source (e.g., AM, FM, satellite and HD signals). The vehicle controller 154 may also be connected to a peripheral device e.g., a disk drive, a portable device (through wired or wireless connection) (not shown). The vehicle controller 154 includes one or more drivers, amplifiers and crossovers (not shown). The crossover separates the audio signal by frequency bands into a low-frequency component, a medium frequency component and a high frequency component and sends the audio signal components to the appropriate speakers. For example, the vehicle controller 154 provides the medium-frequency component of the audio signal to the vehicle mid-range speaker 160 and the high-frequency component to the vehicle tweeter 162. The vehicle controller 154 provides the audio signal to the controller 114 of the speaker system 100, which includes a driver to separate the low-frequency component and provide it to the subwoofer 108. In other embodiments, the vehicle controller 154 provides the low-frequency component to the controller 114, which in turn provides it to the subwoofer 108. The speakers 108, 160 and 162 collectively provide the full-range sound within the vehicle 102.

It is recognized that any controller, circuit or other electrical device disclosed herein may include any number of microprocessors, integrated circuits, memory devices (e.g., FLASH, RAM, ROM, EPROM, EEPROM, or other suitable variants thereof) and software which co-act with one another to perform any number of the operation(s) as disclosed herein. In addition, any one or more of the controllers may be configured to execute a computer-program that is embodied in a non-transitory computer readable medium that is programmed to perform any number of the functions as disclosed.

The speaker system 100 receives electrical energy from the vehicle battery 134 for charging the speaker battery 138. As described above with reference to FIG. 2, the speaker connector 132 mates with the electrical connector 130 of the docking station. The electrical connector 130 is connected to the vehicle battery 134 by the vehicle harness 136 and the speaker connector 132 is connected to the speaker battery 138 by speaker wires 140 to collectively form the charging circuit 142 for charging the speaker battery 138. The vehicle controller 154 is also electrically connected to the vehicle battery 134, as shown in FIG. 5. In one or more embodiments, the speaker system 100 is configured to disconnect the speaker battery 138 from the vehicle battery 134 when a vehicle ignition key (not shown) is turned to the “off” position, to avoid discharging the vehicle battery 134.

Figure 6:
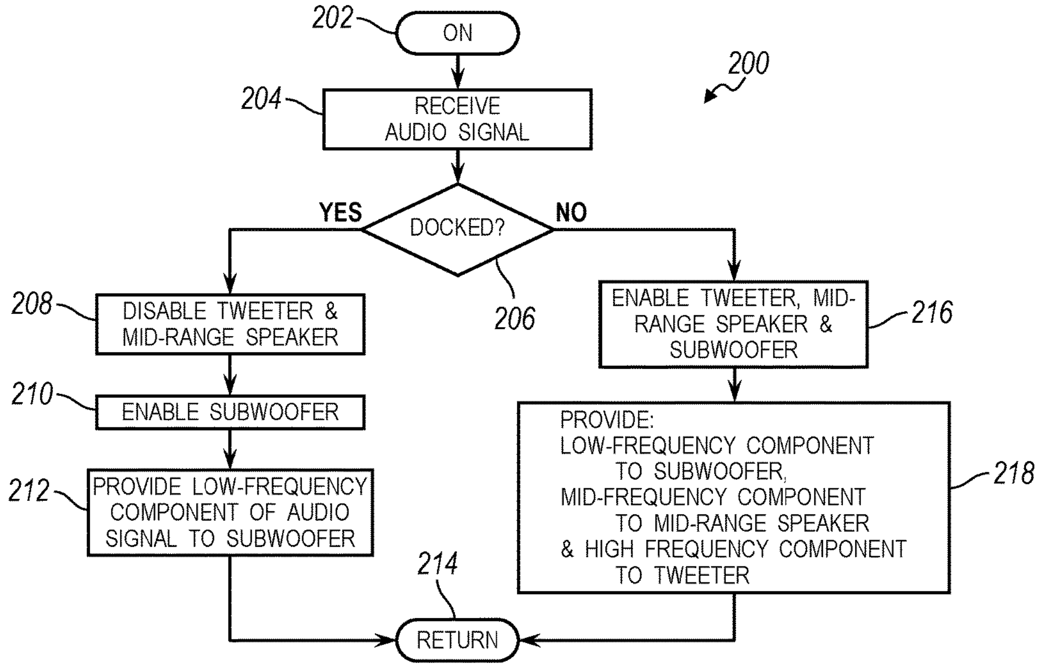
FIG. 6 is a flow chart illustrating a method for controlling the speaker system according to one or more embodiments.

FIG. 6 illustrates a method for controlling the speakers of the speaker system 100 according to one or more embodiments, and is represented by numeral 200. The method is implemented using software code contained within the controller 114, according to one or more embodiments. In other embodiments the software code is shared between multiple controllers (e.g., the controller 114 and the vehicle controller 154).

At operation 202, the controller 114 receives an “on” command. The on command is transmitted to the controller 114 in response to a user pressing a button on the speaker system 100 itself, or by the user sending the command wirelessly, e.g., from a media device 116. Alternatively, the controller 114 may turn on automatically in response to receiving electrical energy through the charging circuit 142 when mounted to the docking station 118 in the vehicle 102.

At operation 204, the controller 114 receives an audio signal. The audio signal may be transmitted by the controller 154 of the vehicle audio system 104 or by a media device 116.

At operation 206, the controller 114 determines whether or not the speaker system 100 is mounted to the docking station, i.e., “docked”. In one embodiment, the controller 114 determines that the speaker system 100 is docked in response to receiving electrical energy from the vehicle battery 134 through the charging circuit 142. In other embodiments, the controller determines the location of the speaker system 100 relative to the vehicle using a known localization method. If the controller 114 determines that the speaker system 100 is docked within the vehicle 102, it proceeds to operation 208.

At operation 208, the controller 114 disables the mid-range speaker 110 and the tweeter 112, e.g., by not providing electrical power to the speakers 110, 112. Then at operation 210, the controller 114 enables the subwoofer 108, e.g., by providing power to it.

At operation 212, the controller 114 provides the low-frequency component of the audio signal to the subwoofer 108. And the subwoofer 108 provides low-frequency sound corresponding to the low-frequency component of the audio signal, as part of the vehicle audio system 104. Then the controller 114 proceeds to operation 214 and returns to operation 204.

If the controller 114 determines that the speaker system 100 is not docked in operation 206, then it proceeds to operation 216. At operation 216, the controller 114 enables the subwoofer 108, the mid-range speaker 110 and the tweeter 112, e.g., by providing power to them.

At operation 218, the controller 114 separates the audio signal by frequency and provides the low-frequency component of the audio signal to the subwoofer 108, the medium-frequency component to the mid-range speaker 110 and the high-frequency component to the tweeter 112. The speakers 108, 110 and 112 provide sound corresponding to their received component of the audio signal and collectively provide full-range sound. Then the controller 114 proceeds to operation 214 and returns to operation 204.

Figure 7:
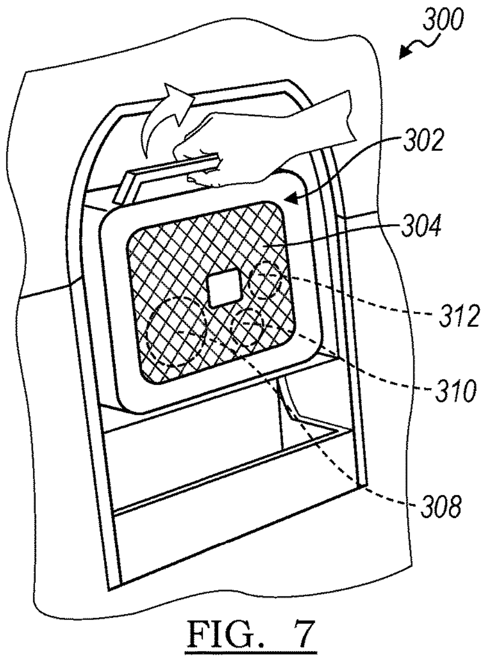
FIG. 7 is a front perspective view of the speaker system of FIG. 1 according to another embodiment and illustrated mounted to the docking station.
Figure 8:
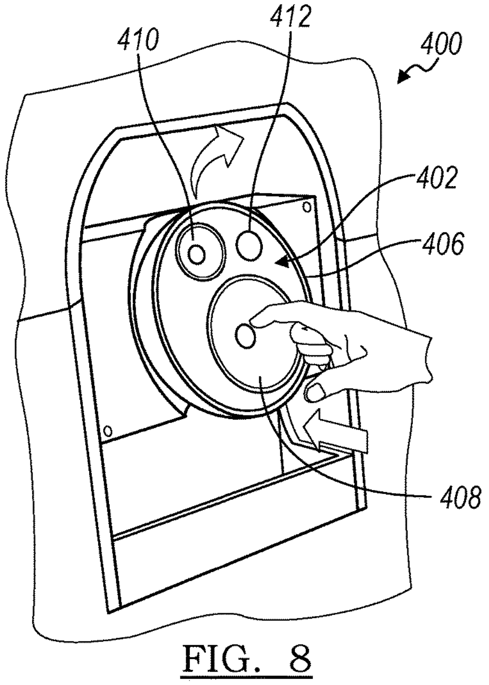
FIG. 8 is a front perspective view of the speaker system of FIG. 1 according to yet another embodiment and illustrated mounted to the docking station.

FIGS. 7-12 illustrate alternate embodiments of the speaker system. FIG. 7 illustrates a speaker system 300 having a rectangular shaped front facie 302 with a common baffle 304 disposed over the speakers, i.e., a subwoofer 308, a mid-range speaker 310 and a tweeter 312. FIG. 8 illustrates a speaker system 400 having a circular shaped front facie 402 that is detachable from a rectangular housing 406. A subwoofer 408 is supported by the housing 406. A mid-range speaker 410 and a tweeter 412 are supported by the detachable front facie 402.

With reference to FIGS. 9-12, a speaker system is illustrated according to an embodiment and referenced generally by numeral 500. The speaker system 500 may be mounted to the vehicle 102 (FIG. 1) and operable as a component of a vehicle audio system 104 (shown in FIG. 4.) The speaker system 500 may also be removed from the vehicle 102 and function as a portable speaker system, as depicted in FIG. 1. The speaker system 500 includes a housing 506 that supports at least three speakers, a low-frequency speaker 508 (e.g., a subwoofer), a mid-range speaker 510 and a high-frequency speaker 512 (e.g., a tweeter).

Figure 9:
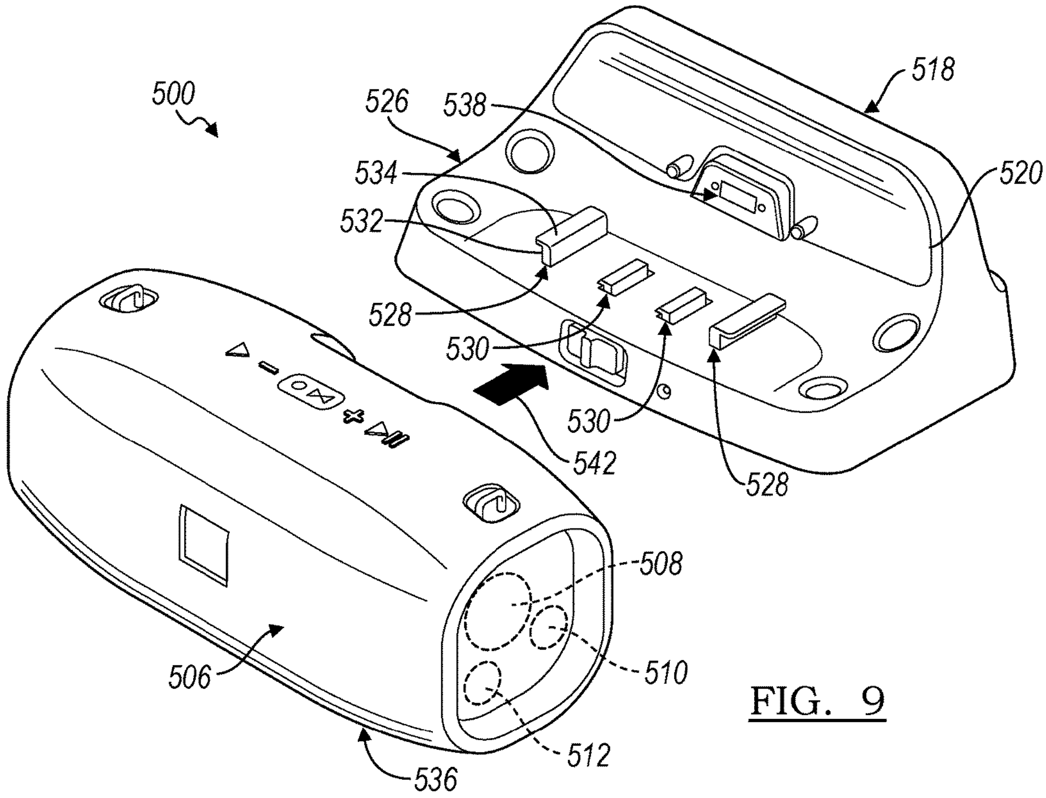
FIG. 9 is a front perspective view of the speaker system of FIG. 1 according to another embodiment and illustrated adjacent to a docking station according to another embodiment.
Figure 10:
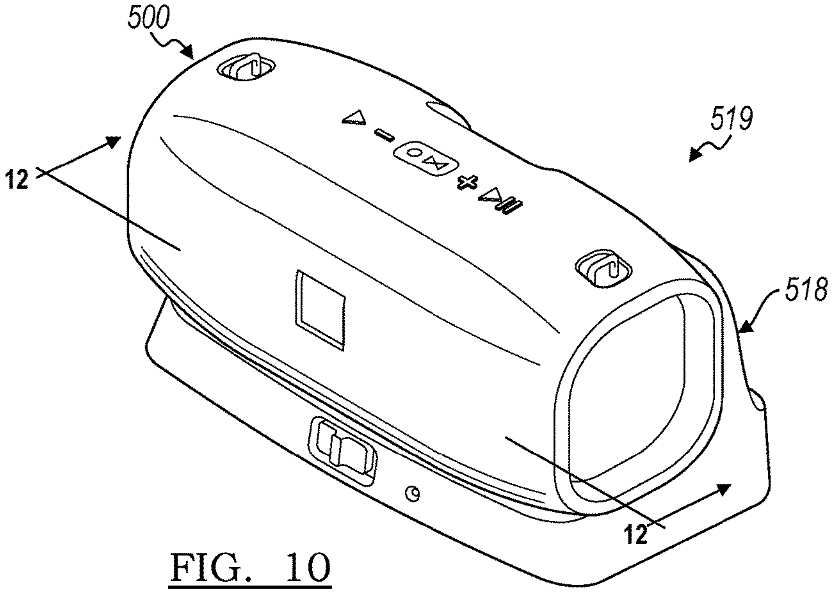
FIG. 10 is another front perspective view of the speaker system of FIG. 9 illustrated mounted to the docking station.

Referring to FIGS. 9-10, the speaker system 500 mounts to a docking station 518, and both are collectively referred to as a speaker assembly 519. The docking station 518 is mounted within the rear storage compartment 105 (FIG. 1), according to one or more embodiments. The docking station 518 includes a recess 520 that defines a cavity that is sized for receiving the speaker system 500. The docking station 118 includes a base 526 for supporting the speaker system 500 and a series of projections that extend transversely from the base 526. The series of projections include fixed projections 528 and locking projections 530. Each projection 528, 530 includes an upright portion 532 that extends from the base 526; and a distal end 534 that extends transversely from the upright portion 532. The distal ends 534 of the projections 528, 530 engage a lower end 536 of the speaker system 100 to help retain the speaker system 100 within the recess 520.

The docking station 518 includes an electrical connector 538 that mates with a corresponding speaker connector (not shown) of the speaker system 100. The electrical connector

538 is connected to the vehicle battery 134 by a vehicle harness 136 (shown in FIG. 4); and the speaker connector is connected to a speaker battery by speaker wires to collectively form a charging circuit for charging the speaker battery (not shown).

Figure 11:
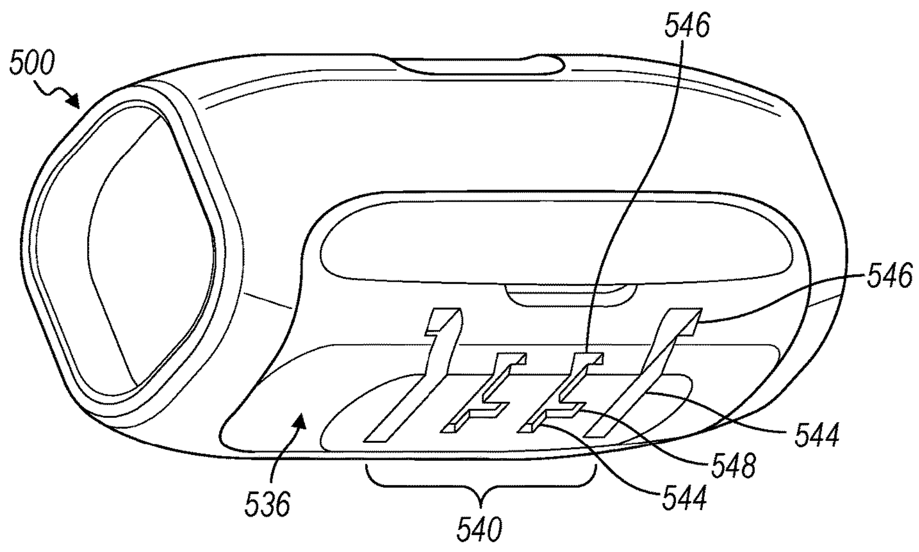
FIG. 11 is a bottom perspective view of the speaker system of FIG. 9.

FIGS. 9-11 illustrate a process for mounting the speaker system 500 to the docking station 518. As shown in FIG. 11, the speaker system 500 includes a series of channels 540 that are formed into the lower end 536 of the housing 506. Each channel 540 is sized to receive the distal end 534 of one of the projections 528, 530 as the speaker system 500 is translated transversely, as depicted by arrow 542 (FIG. 9). FIG. 10 illustrates the speaker system 500 mounted to the docking station 518.

Figure 12:
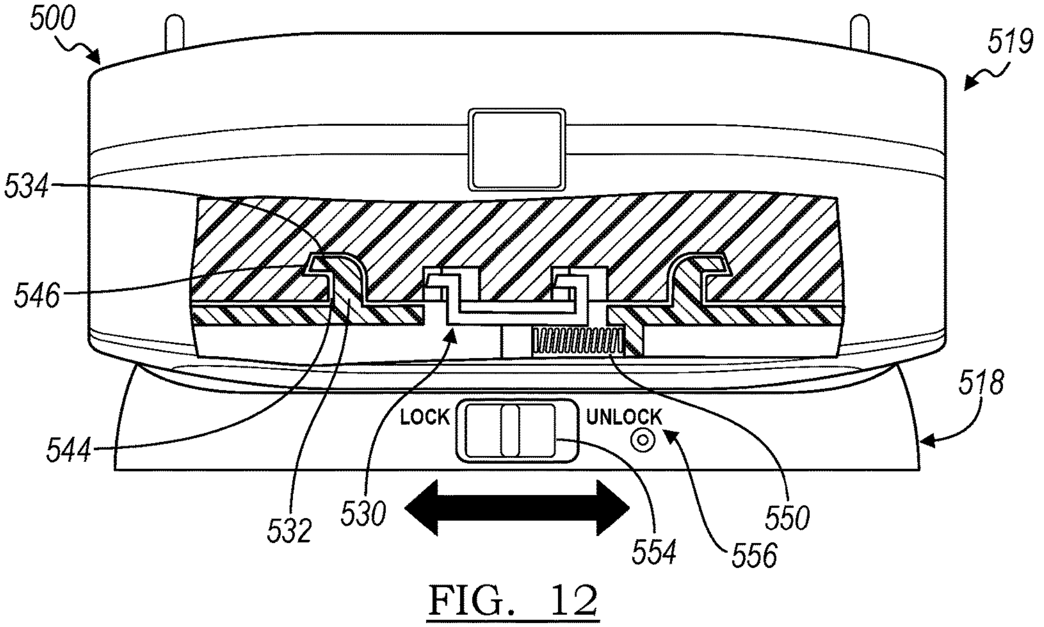
FIG. 12 is a front fragmented partial section view of the speaker system of FIG. 10, taken along section line 12-12 of FIG. 10.

With reference to FIGS. 11-12, the speaker system 500 and the docking station 518 each include features for locking the speaker system 500 to the docking station 518, according to one or more embodiments. As shown in FIG. 11, each channel 540 is formed with a narrow passage 544 extending from the lower end 536 of the housing 506 that is sized for receiving the upright portion 532 of the corresponding projection. Each channel 540 is also formed with an enlarged opening 546 that is sized for receiving the distal end 534 of the corresponding projection. The central channels 540 also include an intermediate opening 548 that extends from the lower end 536 to the enlarged opening 546 of the corresponding channel. The locking projections 530 are spring-biased in a longitudinal direction to engage the lower end 536 of the housing 506 within the corresponding intermediate opening 548 to lock the speaker system 500 to the docking station 518.

According to the illustrated embodiment, the locking projections 530 are connected to each other by a movable base 550, and the docking station 518 includes a compression spring 552 that engages a lower portion of the movable base 550 to bias the locking projections 530 longitudinally (to the left in FIG. 12) to the locked position. The docking station 518 includes a lever 554 that extends from the movable base 550 that allows for manual translation of the locking projections 530. A user may manually translate the lever 554 to the right in FIG. 12 to compress the spring 552, which translates the locking projections 530 out of the intermediate openings 548 to unlock the speaker system 500 from the docking station 518. Once unlocked, the user may remove the speaker system 500 by translating it transversely away from the docking station 518. In one embodiment, the docking station 518 includes informational indicia 556 on the base 526 and adjacent to the lever indicating which position the lever 554 is in, e.g., "locked" or "unlocked."

Other embodiments of the speaker assembly 519 contemplate projections extending from the housing of the speaker system 500 to engage the docking station 518 for retaining the speaker system to the docking station (not shown). Another embodiment of the speaker assembly 519 includes a magnetic interface for retaining the speaker system to the docking station (not shown).

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A speaker assembly comprising:
a housing;
a first speaker supported by the housing;
a second speaker supported by the housing; and
a controller programmed to:
determine a location of the housing relative to a docking station, and
disable the second speaker and control the first speaker to play a low-frequency component of an audio signal in response to the housing being located proximate to the docking station.

2. The speaker assembly of claim 1 wherein the controller is further programmed to control the first speaker to play the low-frequency component of the audio signal and the second speaker to play at least one of a mid-range-frequency component and a high-frequency component of the audio signal in response to the housing being located remote from the docking station.

3. The speaker assembly of claim 1 wherein the controller is further programmed to disable the second speaker by at least one of disconnecting power to the second speaker and by not providing the audio signal to the second speaker.

4. The speaker assembly of claim 1 wherein at least one of the housing and the docking station includes a retainer to engage the other of the housing and the docking station.

5. The speaker assembly of claim 1 further comprising the docking station, wherein the docking station further comprises:
a base for receiving the housing; and
at least one projection extending from the base to engage the housing for retaining the housing to the docking station.

6. The speaker assembly of claim 5 wherein the at least one projection includes a distal end sized to be received in at least one channel extending transversely along a lower end of the housing.

7. The speaker assembly of claim 6 wherein the docking station further comprises a spring coupled to the at least one projection to bias the projection in a longitudinal direction to engage the lower end of the housing within the channel to retain the housing to the docking station.

8. The speaker assembly of claim 1 further comprising:
a battery supported by the housing; and
a connector externally mounted to the housing and in electrical communication with the battery;
wherein the connector is adapted to connect to an external source for charging the battery when the housing is mounted to the docking station.

9. The speaker assembly of claim 8 wherein the controller is further programmed to determine the location of the housing relative to the docking station based on receipt of electrical energy from the external source.

10. The speaker assembly of claim 1 wherein the controller comprises a receiver adapted to receive at least one of a digital signal and an analog signal.

11. A speaker assembly comprising:
a housing;
a first speaker supported by the housing;
a second speaker supported by the housing; and
a controller configured to:
determine a location of the housing relative to a docking station,
disable the second speaker and provide a low-frequency component of an audio signal to the first speaker in response to the housing being located proximate to the docking station, and provide the low-frequency component of the audio signal to the first speaker, and provide at least one of a mid-range-frequency component and a high-frequency component of the audio signal to the second speaker in response to the housing being located remote from the docking station.

12. The speaker assembly of claim 11 wherein the controller is further programmed to disable the second speaker by disconnecting power to the second speaker.

13. The speaker assembly of claim 11 wherein the docking station includes a retainer to engage the housing.

14. The speaker assembly of claim 11 further comprising the docking station, wherein the docking station further comprises:

a base for receiving the housing; and at least one projection extending from the base to engage the housing.

15. The speaker assembly of claim 11 further comprising:

a battery supported by the housing; and a connector externally mounted to the housing and in electrical communication with the battery;

wherein the connector is adapted to connect to an external source for charging the battery when the housing is mounted to the docking station.

16. The speaker assembly of claim 15 wherein the controller is further programmed to determine the location of the housing relative to the docking station based on receipt of electrical energy from the external source.

17. A method for controlling a speaker system comprising:

receiving an audio signal having at least one of a low-frequency component, a mid-range-frequency component and a high-frequency component;

determining a location of a speaker system relative to a docking station;

disabling a second speaker of the speaker system and providing the low-frequency component of the audio signal to a first speaker of the speaker system in response to the speaker system being located proximate to the docking station; and providing the low-frequency component of the audio signal to the first speaker and providing at least one of the mid-range-frequency component and the high-frequency component of the audio signal to the second speaker in response to the speaker system being located remote from the docking station.

18. The method of claim 17 wherein disabling the second speaker further comprises disconnecting power to the second speaker.

19. The method of claim 17 wherein disabling the second speaker further comprises not providing the audio signal to the second speaker.

20. The method of claim 17 wherein determining the location of the speaker system relative to the docking station further comprises:

determining the speaker system to be located proximate to the docking station in response to the speaker system receiving electrical energy from an external source; and determining the speaker system to be located remote from the docking station in response to the speaker system not receiving electrical energy from the external source.

* * * * *